Nov. 14, 1967 M. PANERAI ET AL 3,353,050

ELECTROLUMINESCENT FILAMENT-INDICATOR DEVICE, PARTICULARLY SUITABLE FOR DIGITAL AND/OR ALPHABETICAL DIALS

Filed June 16, 1965

INVENTORS

MARIA PANERAI &

GIUSEPPE PANERAI

BY

Mason, Fenwick & Lawrence

ATTORNEYS

United States Patent Office 3,353,050
Patented Nov. 14, 1967

3,353,050

ELECTROLUMINESCENT FILAMENT-INDICATOR DEVICE, PARTICULARLY SUITABLE FOR DIGITAL AND/OR ALPHABETICAL DIALS

Maria Panerai and Giuseppe Panerai, both of 2 Piazza Galileo Ferraris, Florence, Italy Filed June 16, 1965, Ser. No. 464,437
Claims priority, application Italy, June 25, 1964, 13,748/64
5 Claims. (Cl. 313—108)

ABSTRACT OF THE DISCLOSURE

An electroluminescent display device having a plurality of stacked coaxial wafers each having a selectively actuable discrete electroluminescent symbol.

The present invention refers to an electroluminescent filament-indicator device, particularly suitable for digital and/or alphabetical dials of electronic computers and the like.

As it is known, in many industrial embodiments, such for example the electronic computers, it is necessary to provide a dial representing the digital and/or alphabetical informations which are entered and processed in the computers. Such dials must meet several requirements, such as good visibility, sharpness, operational readiness, and so forth. In many cases, the displaying elements are provided by the so-called grouped-digit decimal indicator tubes, which however are rather complex and delicate, without considering the cost and volume problems that they involve.

The object of the invention is to provide a device of the mentioned kind having a compact shape, of absolute sharpness capable of solving the problem hereinabove set forth.

According to the invention, it is provided an indicator device formed by a set of abutting flat members every one of which comprises a layer of a transparent conductive material, carrying a thin electroluminescent filament shaped as a digital or alphabetical symbol, and a set of conductors suitable for selectively causing the energization of said electroluminescent filaments dependently on the operational conditions of the computing machine.

The invention will be now described with reference to the attached drawings, showing by way of illustration and not of limitation a preferred embodiment of the invention.

Figure 1:
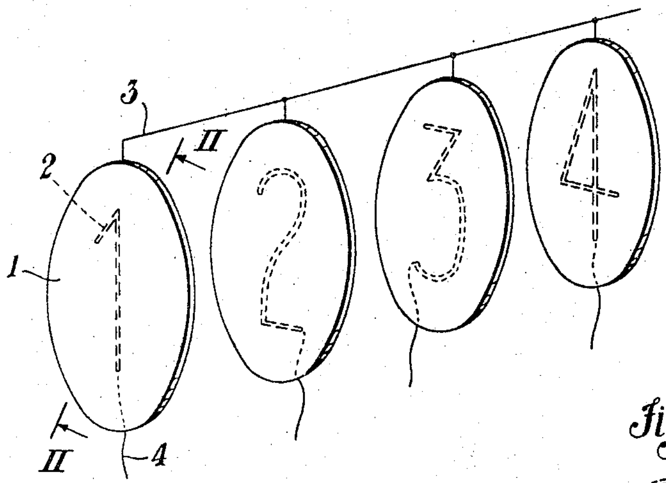
FIG. 1 is an exploded diagrammatic view of the device.

With reference to FIGURE 1, the device comprises a set of wafer elements 1 made of a transparent material, carrying a digital or alphabetical symbol 2 formed by an electroluminescent filament, which is selectively energized by the make of the circuit comprising the common conductor 3 and the conductor 4 connected to the individual filaments 2.

Figure 3:
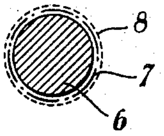
FIG. 3 is a highly enlarged cutaway view of an electroluminescent filament.
Figure 2:
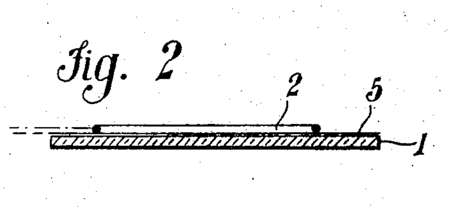
FIG. 2 is a cutaway view of one of the component elements along the plane II—II of FIG. 1.
Figure 5:
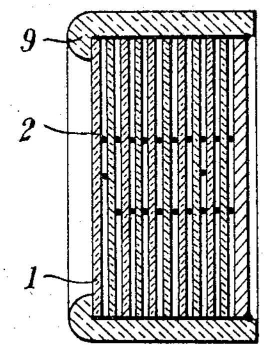
FIG. 5 is a cutaway view along the plane IV—IV of FIG. 4.
Figure 4:
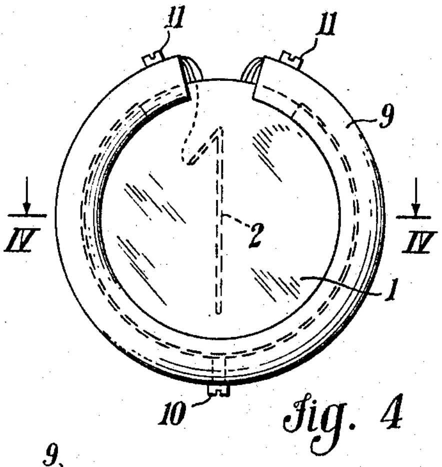
FIG. 4 is a front elevation of the device.
Figure 6:
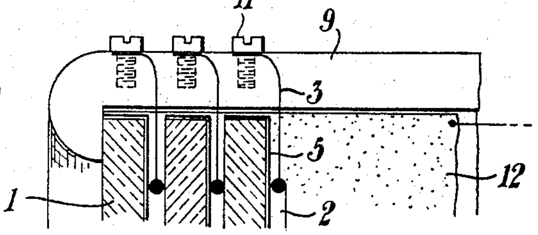
FIG. 6 is a fragmentary sectional view, on an enlarged scale.

Owing to the transparency of the elements 1 and the extreme thinness of the electroluminescent filaments 2, the observer placed in front of the system sees clearly lit up only the symbol which at that moment is energized. Each element (FIGURE 2) is provided by means of a layer of transparent dielectric material, such as glass, plastic material and the like, carrying on one face a conductive layer 5, it too transparent, in which the electroluminescent filament 2 rests. The transparent conductive material 5 is covered by other patents in the name of the same applicants, and therefore it is not herein described in detail. The electroluminescent filament, shown in a highly enlarged cutaway view in FIGURE 3, comprises a thread-like body 6 of copper or other metal which is a good conductor, carrying an insulating covering 7 on which a layer of electroluminescent material 8 is applied. The thicknesses of said elements are very small, therefore the filament at issue, when it is not energized, is virtually invisible. The two conductors 3 and 4 of FIGURE 1 are respectively connected to the transparent conductive layer 5 and to the metallic body 6 of the filament. The elements described are mounted in a close sequence within a cap 9 of a possibly transparent dielectric material (see FIGURES 4 and 5) on which a terminal screw 10 is fitted for the common conductor 3 and a set of terminal screws 11 for the conductors of the individual electroluminescent filaments 2. As shown in FIGURE 6, the common conductor may be omitted, by providing at the inside of the cap 9 a thin layer of conductive lacquer or metal foil 12 making contact with the transparent conductive layer 5 which is applied both on the back of the plates 1, and on their thickness. As clearly shown in the drawings, there is obtained a compact device, of very small volume, which can contain a large number of elements. Although in FIGURE 1 are shown digital symbols, it is however understood that the invention may be usefully employed for manufacturing dials of any kind, suitable for providing displays of letters, mathematic symbols, formulas, diagrams, and the like.

The present invention has been described in a preferred embodiment thereof, it being however understood that changes and modifications may be made without departing from the scope of the invention as set forth in the appended claims.

We claim:

1. An indicator display device comprising a plurality of coaxial closely spaced transparent wafer elements with each wafer element including a thin electroluminescent filament shaped in the form of a discrete symbol, and mounted on a thin layer of transparent conductive material supporting said filament, a plurality of selectively operable conductors respectively connected to said filaments and a common conductor connected to each layer of conductive material so that actuation of a selected one of said selectively operable conductors causes the filament to which it is connected to glow to provide a visual indication of the filament's shape.

2. A device according to claim 1, wherein said layer of transparent conductive material is applied on a thin transparent backing plate of dielectric material.

3. A device according to claim 2, wherein said electroluminescent filament comprises a thread-like body of a conductive metal covered by an extra-thin layer of insulating material on which a thin layer of an electroluminescent material is applied.

4. A device according to claim 3, wherein the set of wafer elements is assembled within a cap of dielectric material carrying a set of terminal screws associated to the individual filaments and a terminal screw associated to the common conductor.

5. A device according to claim 4, wherein the common conductor is provided by means of a thin metal layer applied at the inside of said cap and making contact with the transparent conductive layer of each element.

References Cited

UNITED STATES PATENTS

| | | | |
|---|---|---|---|
| 2,922,993 | 1/1960 | Sack | 313—108 |
| 3,002,121 | 9/1961 | Bramley et al. | 313—108 |
| 3,041,491 | 6/1962 | Cistola | 313—109.5 |
| 3,182,415 | 5/1965 | Brooks | 315—169 |
| 3,205,403 | 9/1965 | Schwertz | 315—169 |

DAVID J. GALVIN, *Primary Examiner.*